United States Patent [19]

Yasumatsu et al.

[11] Patent Number: 5,307,494
[45] Date of Patent: Apr. 26, 1994

[54] FILE NAME LENGTH AUGMENTATION METHOD

[75] Inventors: Kazuki Yasumatsu; Toshihide Satoh, both of Tokyo, Japan

[73] Assignee: Fuji Xerox Co., Ltd., Tokyo, Japan

[21] Appl. No.: 26,193

[22] Filed: Feb. 26, 1993

Related U.S. Application Data

[63] Continuation of Ser. No. 739,720, Jul. 30, 1991, abandoned, which is a continuation of Ser. No. 228,650, Aug. 5, 1988, abandoned.

[30] Foreign Application Priority Data

Aug. 5, 1987 [JP] Japan ................................ 62-197221

[51] Int. Cl.$^5$ ................................................. G06F 7/10
[52] U.S. Cl. .................................................... 395/600
[58] Field of Search ................................ 364/200, 900

[56] References Cited

U.S. PATENT DOCUMENTS

| | | | |
|---|---|---|---|
| 4,356,549 | 10/1982 | Chueh | 364/200 |
| 4,437,127 | 3/1984 | Hirose | 358/296 |
| 4,611,272 | 9/1986 | Lomet | 364/200 |
| 4,644,468 | 2/1987 | Doster et al. | 364/200 |
| 4,675,810 | 6/1987 | Gruner et al. | 364/200 |
| 4,680,700 | 7/1987 | Hester et al. | 364/200 |
| 4,712,032 | 12/1987 | Mohri | 364/900 |
| 4,748,320 | 5/1988 | Yorimoto et al. | 235/492 |
| 4,780,816 | 10/1988 | Connell | 364/200 |
| 4,803,614 | 2/1989 | Banba et al. | 364/900 |
| 4,817,032 | 3/1989 | Ohata et al. | 364/900 |
| 4,829,296 | 5/1989 | Clark et al. | 340/825.31 |
| 4,853,846 | 8/1989 | Johnson et al. | 364/200 |
| 4,853,849 | 8/1989 | Bain, Jr. et al. | 364/200 |
| 4,888,690 | 12/1989 | Huber | 364/200 |
| 4,922,417 | 5/1990 | Churm et al. | 364/200 |
| 5,012,405 | 4/1991 | Nishikade et al. | 364/200 |

OTHER PUBLICATIONS

World Software Corp.: "Extend-A-Name" pp. 1-19, 20-59.
PC Expo New York, Show directory 6th annual vol. Buying Week, pp. 96-97, Jun. 21, 1988.

Primary Examiner—Dale M. Shaw
Assistant Examiner—Christopher B. Shin
Attorney, Agent, or Firm—Finnegan, Henderson, Farabow, Garrett & Dunner

[57] ABSTRACT

A method of augmenting the length of the name of a file in a computer system which allows the use of file names longer than otherwise allowed by the system. A file name table is searched for a table entry corresponding to a long provisional name. An actual file name contained in the corresponding table entry is used to access the file.

2 Claims, 10 Drawing Sheets

FILE NAME LENGTH AUGMENTATION METHOD

This application is a continuation of application Ser. No. 07/739,720, filed Jul. 30, 1991, now abandoned, which is a continuation of application Ser. No. 07/228,650, filed Aug. 5, 1988, now abandoned.

BACKGROUND OF THE INVENTION

The present invention relates to a method of augmenting the length of the name of a file without changing the file management method of a computer system.

There is usually a limit to the length of a file name that can be managed by a computer system. Therefore, a file having a name with a length beyond the limit cannot be used. If a name whose length is beyond the limit is used for a file in a program, the portion of the name beyond the limit is neglected and the name may substantially coincide with that of another file.

SUMMARY OF THE INVENTION

The present invention allows the use of file names which are longer than is permitted by a computer system.

Accordingly, it is an object of the present invention to less expensively provide a file name length augmentation method which is of high reliability and which makes it possible to render the length of the name of a file substantially limitless for the use thereof in a program without changing the file name management method of a computer system which handles and manages the file.

Additional objects and advantages of the invention will be set forth in part in the description which follows and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for augmenting the length of a name of a file, wherein the file name is a series of characters recognized by a computer system recognizing only file names having a length less than a predetermined length, the method comprising the steps of: obtaining a provisional file name having a length of at least the predetermined length; searching a file name table having a plurality of table entries for a table entry corresponding to the provisional file name, wherein each table entry includes: a flag field for indicating that the table entry is valid, an actual file name field containing a file name shorter than the predetermined length, an augmented file name field containing an augmented file name having a length at least equal to the predetermined length, and wherein the corresponding table entry contains an augmented file name identical to the provisional file name; selecting the corresponding table entry when the flag field indicates that the corresponding table entry is valid; and accessing the file using the file name contained in the actual file name field of the selected corresponding table entry.

The file name length augmentation method has a conversion means by which the provisional name of the file in the program is converted into an actual name whose length is limited for the computer system. The file can be accessed through the use of the provisional name.

The provisional name is appointed out of file names appointed by the program to request the input or output of data of the file. The provisional name is converted into the actual name by a file name extension system. The actual name is used to request the input or output of data of the file to (or from) the computer system. The file can thus be input or output by using the longer provisional name instead of the actual name of limited length without altering the file management method of the computer system.

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Embodiments of the present invention are hereafter described in detail with reference to the drawings attached hereto. Wherever possible, the same reference numbers will be used throughout the drawings to refer to the same or like parts.

Figure 1:
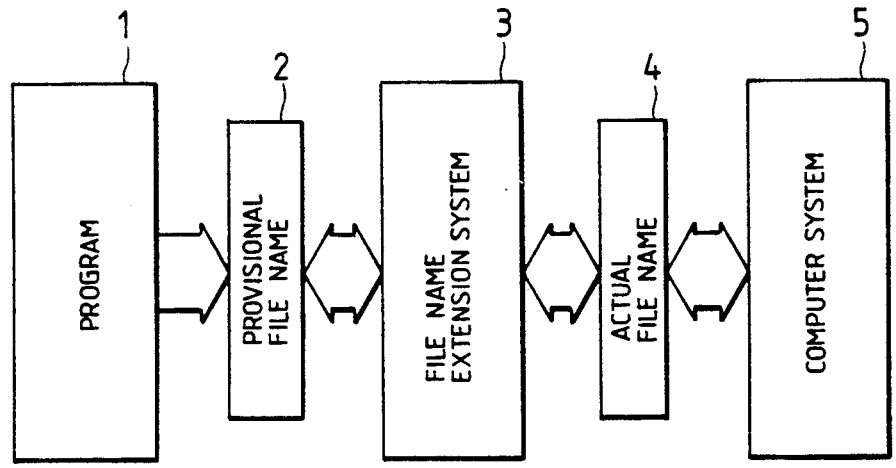
FIG. 1 is a block diagram of a file name length augmentation method of the present invention.

FIG. 1 shows a file name length augmentation method of a first embodiment of the present invention. FIG. 1 shows a program 1 which operates on a computer system 5, a provisional name 2 of a file, a file name extension system 3, an actual name 4 of the file, and the computer system 5 for which the length of the name of each file is of limited length. The file name appointed by the program 1, which operates on the computer sytem 5, is herein called the provisional name. The file name appointed by the file name extension system 3 for internal use by the computer system 5 is herein called the actual name. The provisional name 2, for requesting the input or output of data of the file, is appointed by the program 1. The provisional name 2 is converted into the actual name 4 by the file name extension system 3. The input or output of data of the file is requested of the computer system 5 by using the actual name 4.

Figure 2:
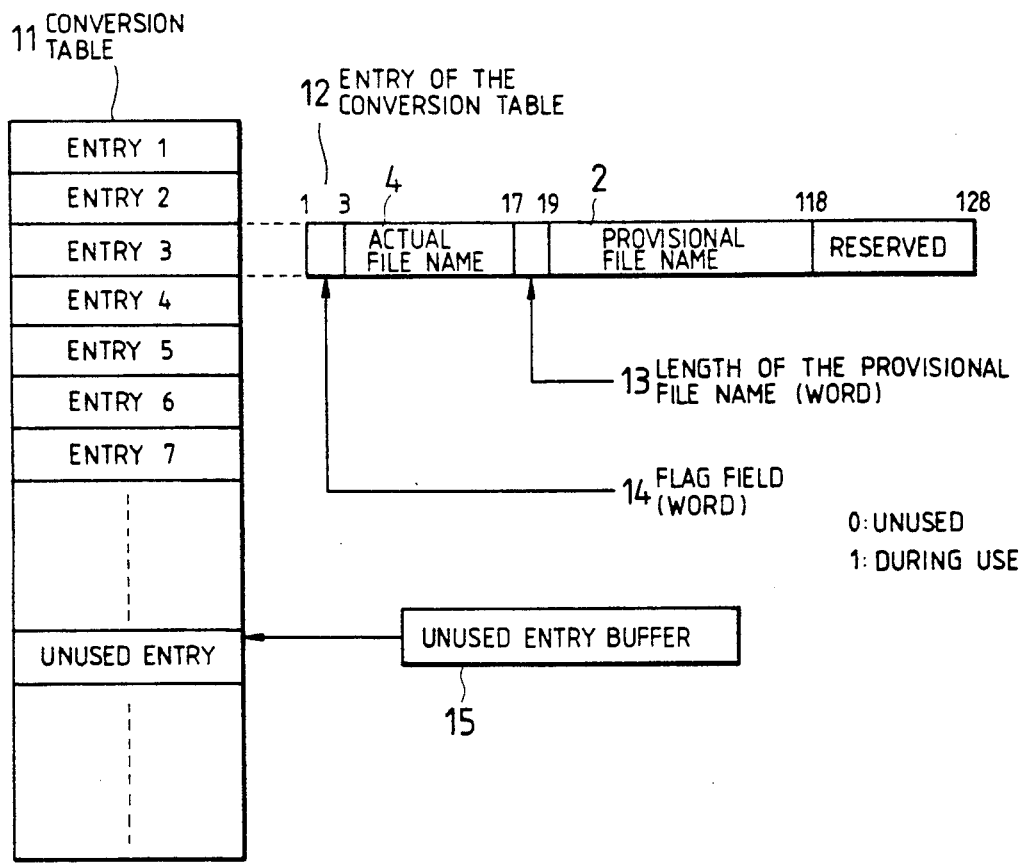
FIG. 2 shows a conversion table for converting the provisional name of a file into the actual name thereof.
Figure 3:
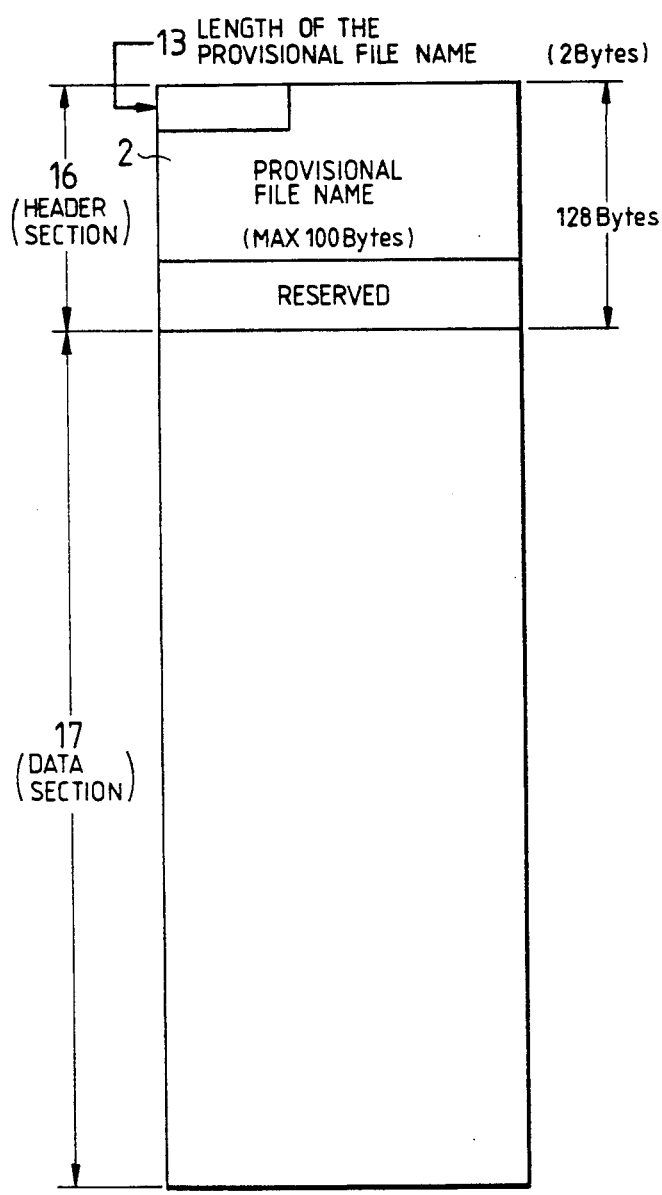
FIG. 3 shows a data format of the file.
Figure 4:
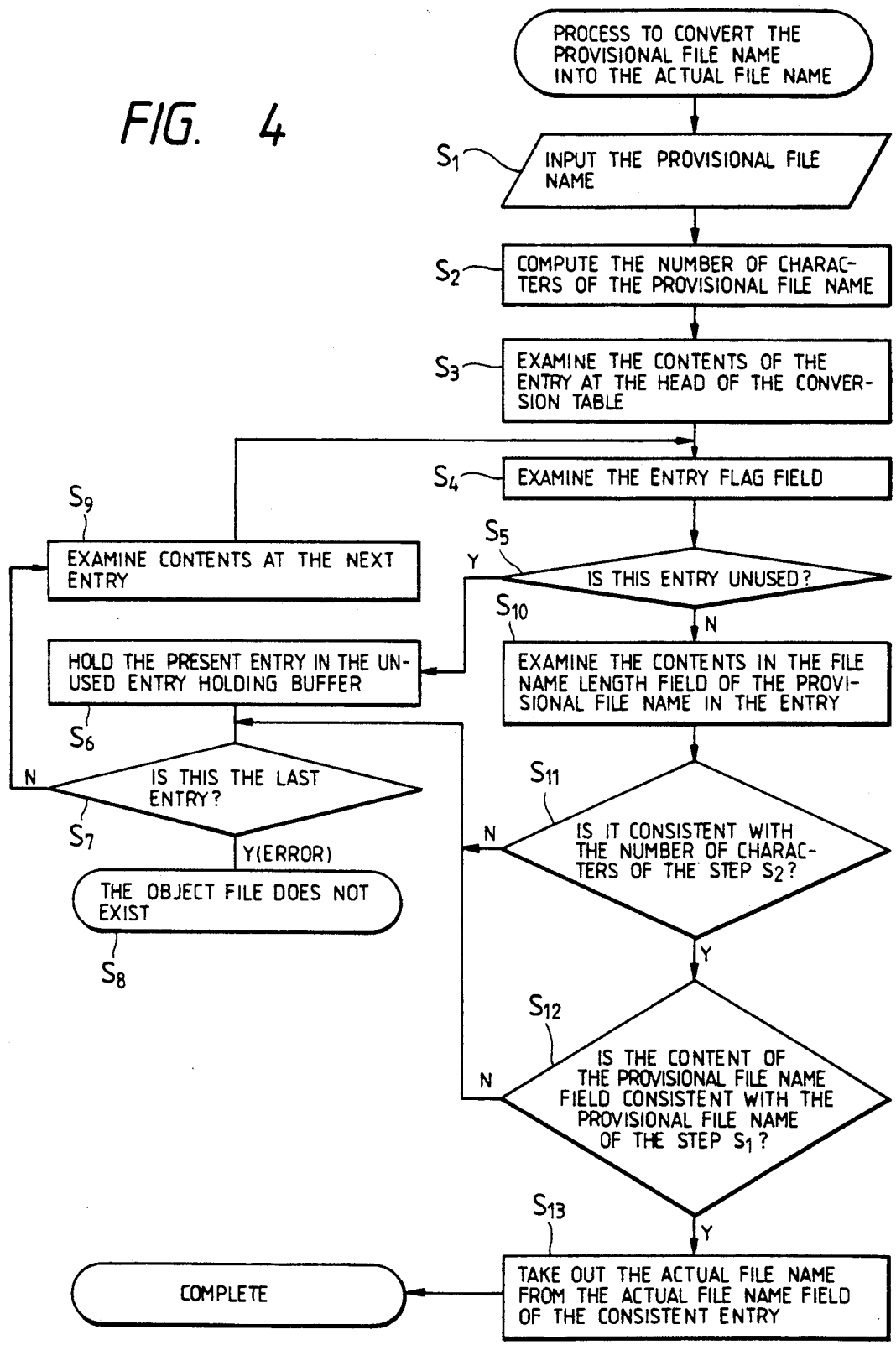
FIG. 4 shows a flow of processing in a file name extension system.
Figure 5:
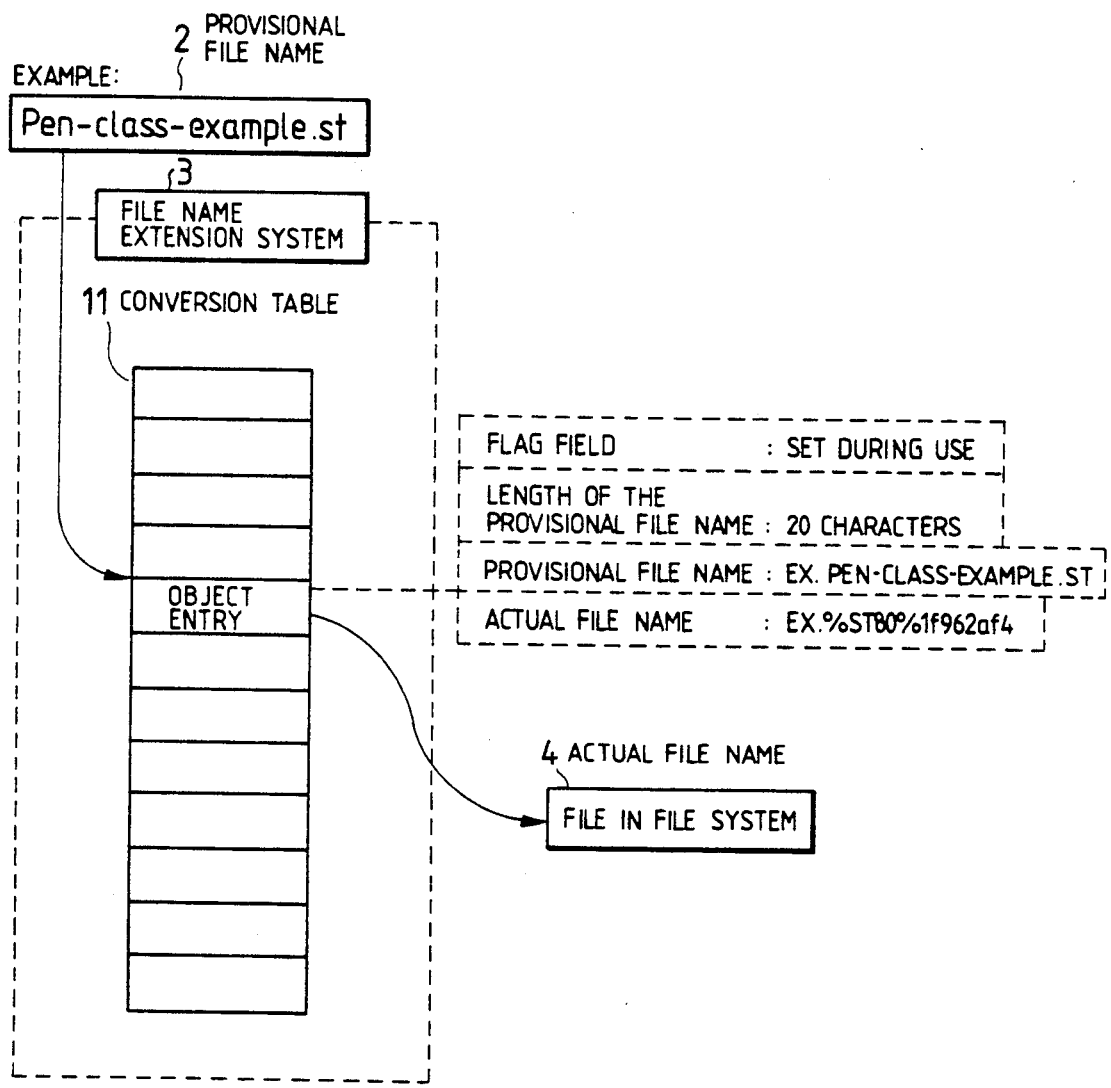
FIG. 5 shows a flow of control in the file name extension system.

Conversion of the provisional name 2 of the file into the actual name 4 thereof is now described with reference to FIGS. 2, 3, 4, and 5. FIG. 2 shows a conversion table 11 for converting the provisional name 2 into the actual name 4. FIG. 3 shows a data format of the file. FIG. 4 shows a flow of processing in the file name extension system 3. FIG. 5 shows a flow of control in the file name extension system 3. Further shown in FIG. 2 are an entry 12 of the conversion table 11, a length field 13 containing the length of the provisional name 2, a flag field 14, and an unused entry buffer 15. FIG. 3 further shows a header section 16, and a date section 17.

The conversion table 11 shown in FIG. 2 provides information necessary for the file name extension system 3 to obtain the actual name 4 of the file from the provisional name 2 thereof. Although the conversion table 2 is stored in a file in this embodiment, the present invention is not confined therto but may be otherwise embodied so that the conversion table is stored in a memory or the like.

It is supposed in this embodiment that the limit to the length of the characters of the provisional name 2 of the file is 100 characters and that the limit to the length of the characters of the actual name 4 of the file is 14 characters. In addition, the size of each entry 12 of the conversion table 11 is fixed at 128 bytes. The flag field 14, which is one word in length, occupies the first and second bytes of the entry 12 of the conversion table 11 to indicate whether or not the entry is unused. The actual name 4 of the file occupies the third through the sixteenth bytes of the entry 12 of the conversion table 11. The number of the characters of the provisional name 2 of the file occupies the seventeenth and eighteenth bytes of the entry 12 of the conversion table 11. Before matching is performed on the provisional name of the file, the conversion table 11 is scanned for entries with provisional file names of a same length as the provisional file name to be located. The provisional name 2 of the file occupies the nineteenth through the one-hundred-eighteenth bytes of the entry 12 of the conversion table 11. The one-hundred-nineteenth through the one-hundred-twenty-eighth bytes of the entry 12 of the conversion table 11 are not used in this embodiment, but can provide a region for extension.

When the entry 12 is unused, the number of the entry is entered in the unused entry buffer 15 so that an unused entry can later be found without searching the conversion table 11 when another entry corresponding to the provisional and actual names of a file is to be entered in the conversion table 11.

As shown in FIG. 3, the data format of the file is such that the file itself contains the provisional name corresponding to its actual name, in order to automatically create the conversion table 11 which is to be referred to by the file name extension system 3. The header section 16 has a size of 128 bytes. The length field 13 of the provisional name 2 of the file occupies the first and second bytes of the header section 16. The provisional name 2 itself occupies the third through one-hundred-second bytes of the header section 16. The one-hundred-third through one-hundred-twenty-eighth bytes of the header section 16 are not used in this embodiment, but can provide a region for extension. The data section 17 holds data similar to those of an ordinary file.

FIG. 5 shows the flow of control which is performed when the file name extension system 3 converts the actual name (the number of the characters of which is limited to be relatively small) of the file from the file's provisional name (the number of the characters of which is relatively large). This conversion is performed by referring to the conversion table 11 of FIG. 2.

The actual flow of processing in the above-mentioned operation of the file name extension system 3 is described with reference to a flow chart shown in FIG. 4. In a step $S_1$ shown in the flow chart, the provisional name (the number of the characters of which is relatively large) of the file is delivered from an application program or the like to the file name extension system 3. In a step $S_2$, the file name extension system 3 calculates the length of the delivered provisional name of the file. In a step $S_3$, the contents of an entry at the head of the conversion table 11 are examined. In a step $S_4$, the contents of the flag field of the entry are examined. In a step $S_5$, it is judged from the flag field whether or not the entry is being used. If it is judged in the step $S_5$ that the entry is being used, the contents of the field of the entry for the number of the characters of the provisional name of the file are examined in a step $S_{10}$. In a step $S_{11}$, the contents of the field containing the number of the characters of the provisional name are examined. The number of characters of the provisional name, which is calculated in the step $S_2$, and the number of characters of the provisional name in the entry, which is determined in the step $S_{10}$, are compared with each other. If the compared numbers coincide with each other in step $S_{11}$, a step $S_{12}$ is taken. In step $S_{12}$, the provisional name of the file is extracted from the provisional name registration field of the present entry. This extracted name is then compared with the provisional name input in the step $S_1$. If the provisional names compared with each other in the step $S_{12}$ coincide, a step $S_{13}$ is taken so that the actual name of the file is taken out from the actual name registration field of the entry having the coincidence detected in the step $S_{12}$. The flow of the control for converting the actual name of the file to the provisional name thereof is thus terminated. The input or output of data of the file can be requested from the computer system 5 through the use of the actual name of the file.

If the objects compared with each other in each of the steps $S_{11}$ and $S_{12}$ do not coincide with each other, a step $S_7$ is taken as described below. If it is judged in the step $S_5$ that the entry is not being used, the present entry is held as an unused entry in the unused entry buffer 15 (shown in FIG. 2) in a step $S_6$ and the step $S_7$ is then taken. In the step $S_7$, it is judged whether or not the present entry of the conversion table 11 is the last entry of the conversion table. If it is judged in the step $S_7$ that the present entry is the last entry, it is understood in a step $S_8$ that a file corresponding to the provisional name input in the step $S_1$ does not exist. If it is judged in the step $S_7$ that the present entry is not the last entry, the contents of the entry following the present entry are selected as a new present entry in a step $S_9$. After the step $S_9$ is taken, the step $S_4$ taken again so that the above-described process is repeated.

The flow of control shown in FIG. 5 corresponds to the step $S_1$ shown in the flow chart in FIG. 4. The file name extension system 3 shown by a dotted line in FIG. 5 performs the processing in the steps from $S_3$ through $S_{13}$ shown in FIG. 4. The actual name 4 of the file is obtained by using the provisional name 2 of the file as input to the conversion processing in the file name extension system 3. Since the actual name 4 of the file can be managed by the computer system 5 to perform processing after the step $S_{13}$ shown in the flow chart in FIG. 4, the actual name of the file can be used for the input or output of data of the file.

Figure 6:
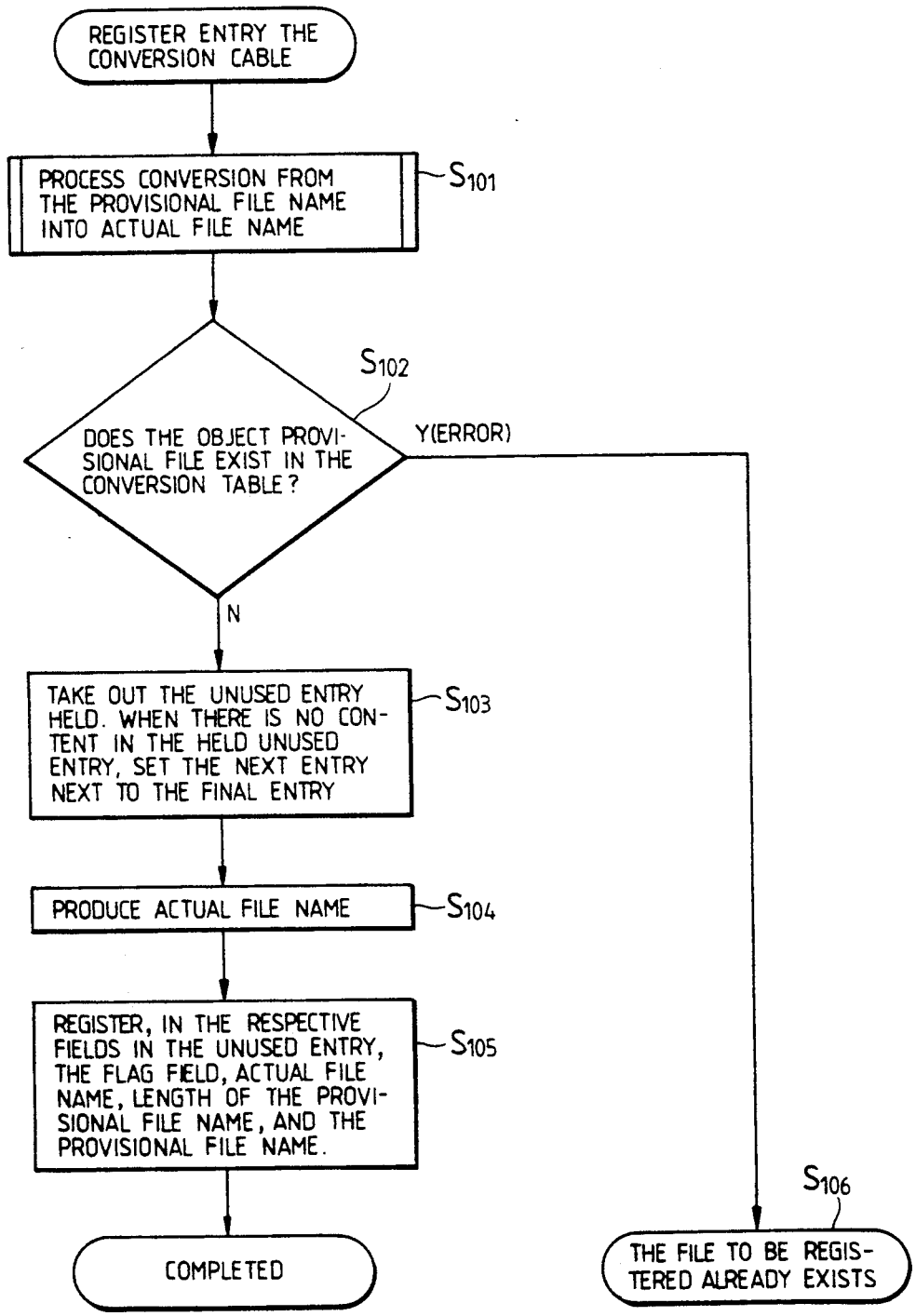
FIG. 6 shows a flow of processing in registering a new entry of the conversion table of FIG. 2.
Figure 7:
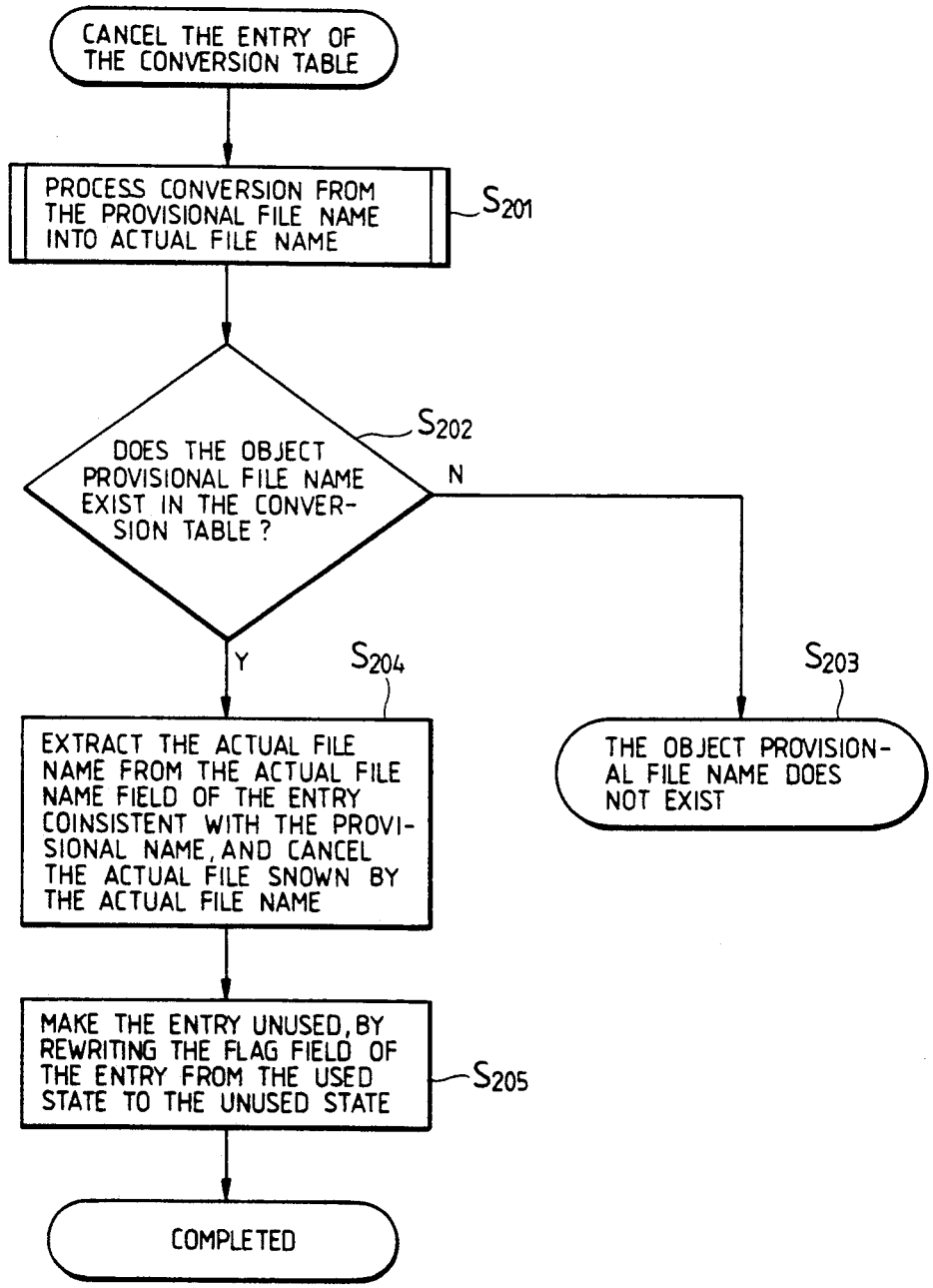
FIG. 7 shows a flow of processing in deleting an entry of the conversion table of FIG. 2.

The flow of processing in the registration and deletion of the entry of the conversion table 11 is now described with reference to FIGS. 6 and 7. A new entry is registered in the conversion table 11 when a new file is created. An entry of the conversion table 11 is removed whenever a file corresponding to that entry is deleted.

The flow of the processing in the registration of the entry of the conversion table 11 is first described with reference to a flow chart in FIG. 6. Step $S_{101}$ performs the same processing as the conversion of the provisional name of the file to the actual name thereof which is described above with reference to the flow chart in FIG. 4. In a step $S_{102}$, it is judged whether or not the provisional name from the step $S_{101}$ exists in the conversion table 11. If it is judged in the step $S_{102}$ that the provisional name appointed in the step $S_{101}$ exists in the conversion table 11, a step $S_{106}$ is performed to indicate that the appointed provisional name cannot be registered in the conversion table 11 because the file to be newly created already exists.

If it is judged in the step $S_{102}$ that the provisional name appointed in the step $S_{101}$ does not exist in the conversion table 11, an unused entry preserved in the unused entry buffer 15, as described above with reference to the flow chart in FIG. 4, is taken from the buffer in a step $S_{103}$. If the preserved unused entry is empty, a new entry is provided after the last entry of the conversion table 11. The unused entry of the conversion table 11, in which the file is to be newly registered, can thus be taken out in the step $S_{103}$. In the step $S_{104}$, the actual name of the file, which corresponds to the appointed provisional name thereof, is created. At that time, any name can be created as the actual name of the file as far as the name is within the limit (within fourteen characters in this embodiment) for the length of the actual name of the file.

In this embodiment, however, the created name is provided with a six-character fixed field such as %ST80%, which forms the first six characters of the name. The six-character fixed field in the head part of the name of the file means that the file has a header in the name thereof. Any specification may be set for the other field of the actual name of the file. In this embodiment, the other field is made unique by using a character conversion of the number (hexadecimal number) of the seconds which have elapsed from Greenwich Mean Time of 00 h. 00 min. 00 sec. on Jan. 1, 1970 through the present. The unique field and the preceding fixed field are combined with each other so that the actual name, such as %ST80%11962af4, is created as shown in FIG. 5. A flag field, the actual name of the file, the length of the provisional name thereof, and the provisional name itself are placed in the fields of the unused entry as shown in FIG. 2 so that the provisional name of the file and the actual name thereof correspond to each other. The registration of the entry of the conversion table 11 is thus terminated.

The processing of deleting an entry of the conversion table 11 is now described with reference to a flow chart in FIG. 7. In a step $S_{201}$ shown in the flow chart, the same processing as the conversion of the provisional name of the file to the actual name thereof, which is described above with reference to the flow chart in FIG. 4, is performed. In a step $S_{202}$, it is judged whether or not the provisional name appointed in the step $S_{201}$ exists in the conversion table 11. If it is judged in the step $S_{202}$ that the provisional name appointed in the step $S_{201}$ does not exist in the conversion table 11, a step $S_{204}$ is taken so that the actual name is extracted from the actual name field of the entry having a provisional name coincident with the appointed provisional name, and an actual file is deleted on the basis of the extracted actual name. In a step $S_{205}$, the flag field of the entry is rewritten to indicate that the entry is unused. The deletion of the entry of the conversion table 11 is thus terminated.

The file name extension system 3, which makes it possible to request the input or output of data of a file by using a relatively long name instead of a relatively short name without changing the file management method of the computer system 5, is thus realized.

Figure 8:
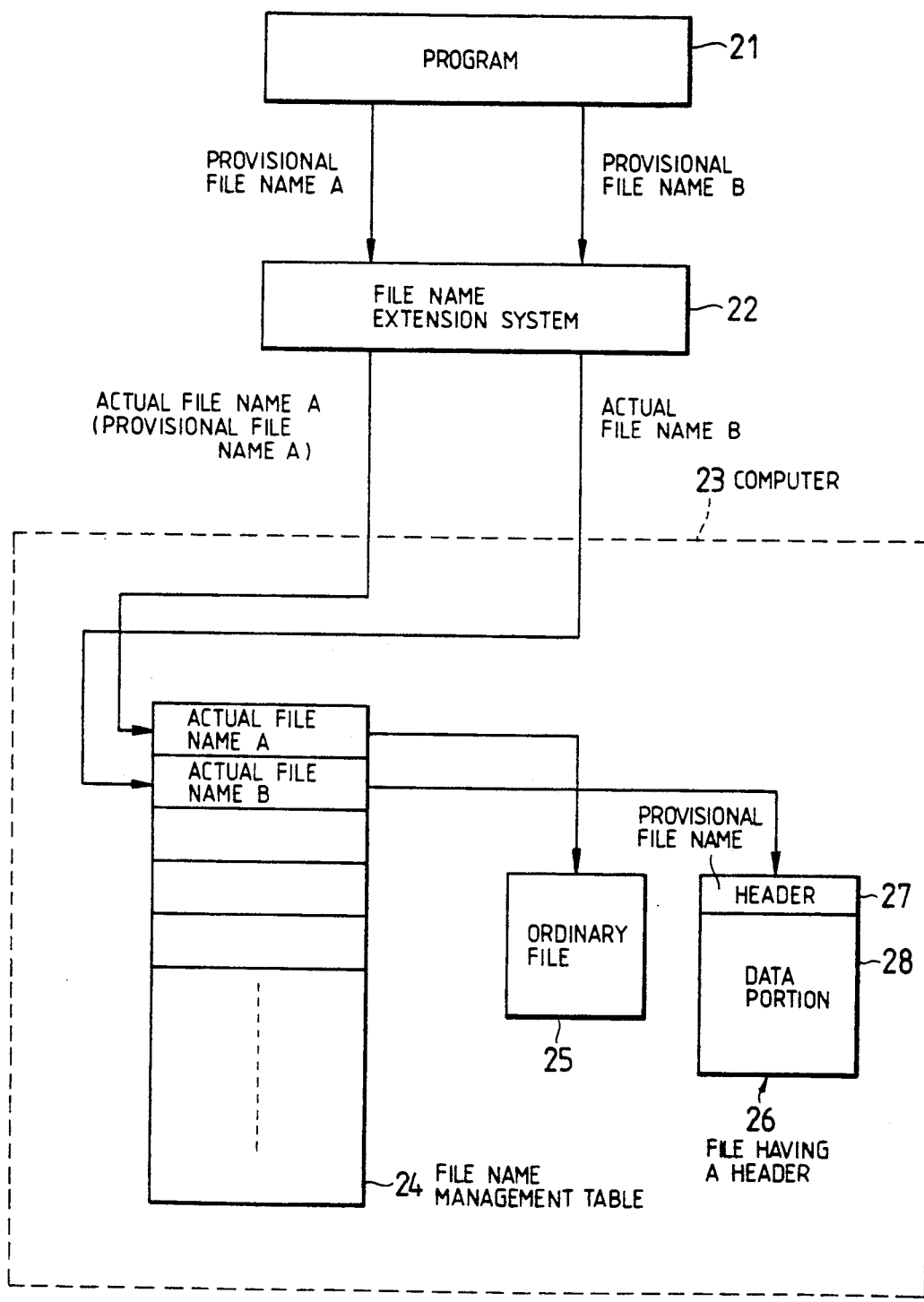
FIG. 8 shows a file name length augmentation method which is another embodiment of the present invention.

FIG. 8 shows the constitution of a file name length augmentation method which is a second embodiment of the current invention. Shown in FIG. 8 are a program 21, a file name extension system 22, a computer system 23, a file name management table 24 contained in the computer system 23, an ordinary file 25, and a file 26 having both a header 27 and a data section 28. It is supposed in this embodiment that the limit to the length of the name of each file in the computer system 23 is 14 characters and the limit to the length of the name of each file in the file name extension system 22 is 255 characters.

A provisional name of a file which comes from the program 21 and has a length of 14 characters or less is called "the provisional name A" in this embodiment. A provisional name of a file which comes from the program 21 and has a length of more than 14 characters is called "the provisional name B" in this embodiment. The file name extension system 22 uses the provisional name A as an actual name without conversion. On the other hand, the file name extension system 22 performs a calculation for the provisional name B using a method described hereinafter, so that the system creates an actual name B. For the actual name A, the ordinary file 25 having no header 27 is created and the provisional name is stored in the header. The actual names A and B are contained in entries in the file name management table 24.

In this embodiment, processing can be rapidly performed because a file name of 14 characters or less is not converted and because no header is provided for such a file. Since the file name management table 24 of the computer system 23 itself is used and a conversion table is not created in this embodiment, it is not necessary to create a table file or to register or delete the contents of the table file. Therefore, not only can processing be rapidly performed but the safety of the computer system also can be enhanced.

Figure 9:
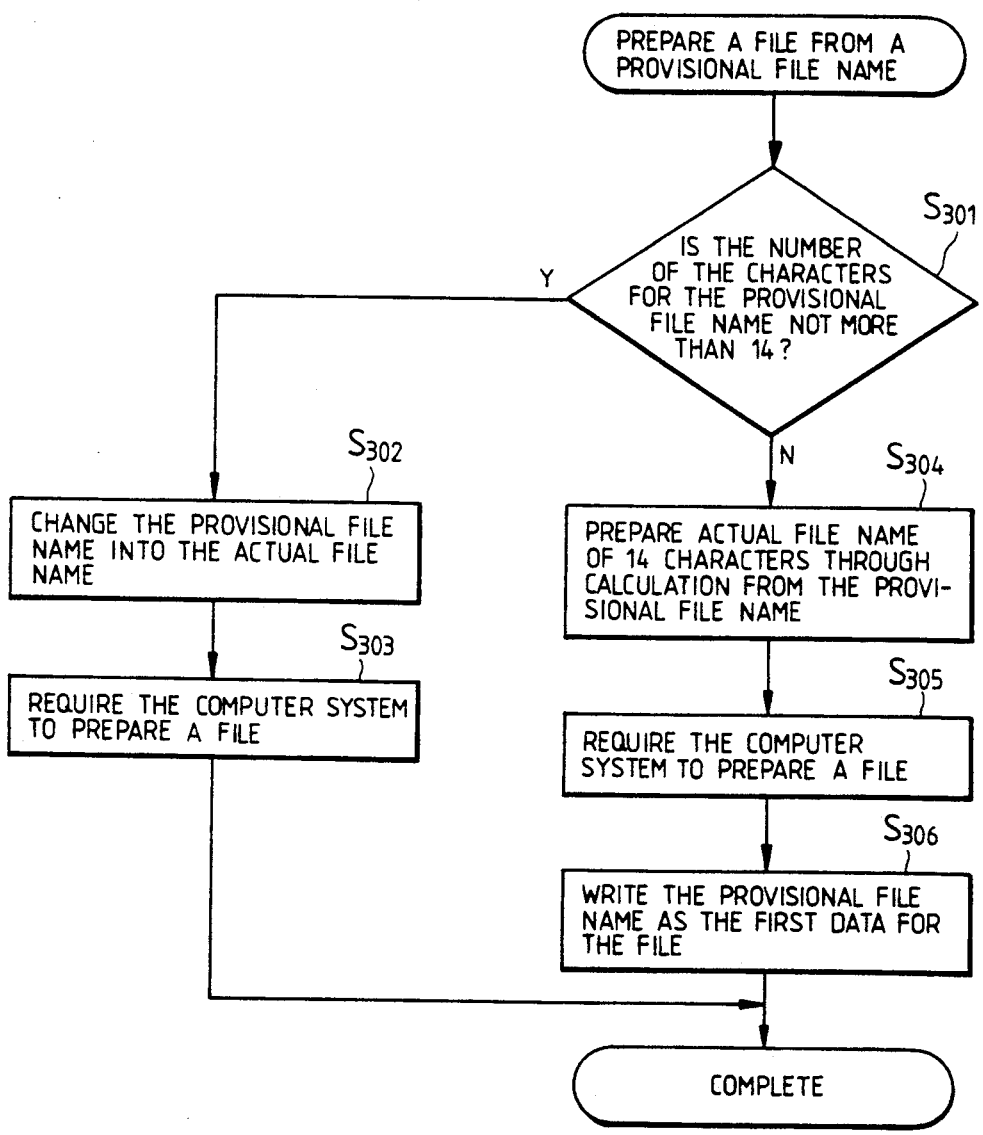
FIG. 9 shows a flow of processing in creating a file having a provisional name.

Creation of a file depending on the provisional name in this embodiment is now described with reference to a flow chart shown in FIG. 9. FIG. 9 describes the flow of processing used to create a new file in the file name extension system 22. In step $S_{301}$ shown in the flow chart, the length of the provisional name is checked. When a file with a provisional name having a length of 14 characters or less is created by the program 21, the file name extension system 22 handles the provisional name as an actual name in a step $S_{302}$. Thus, in a step $S_{303}$, the file name extension system 22 requires the computer system 23 to create an ordinary file 25 having no header and registers the provisional name A (actual name) in the file name management table 24.

When a file whose provisional name has a length of more than 14 characters is created by the program 21, the file name extension system 22 creates an actual name of 14 characters in length from the provisional name in a step $S_{304}$, and requests the creation of the file to the computer system 23 in a step $S_{305}$. A header 27 is provided for the file having the actual name so that the provisional name is stored in the header, in a step $S_{306}$. As a result, the computer system 23 creates the file having a header, and registers the actual name in the file name management table 24.

Figure 10:
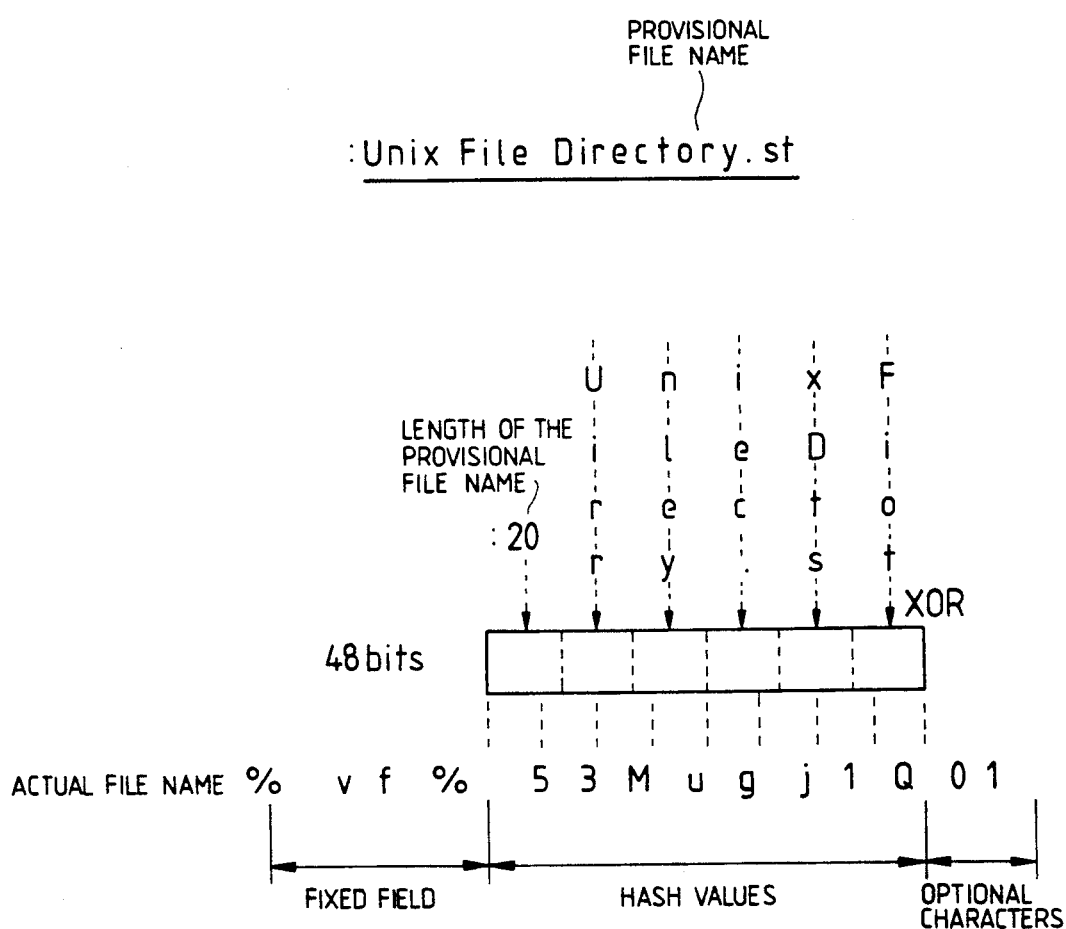
FIG. 10 shows a diagram describing how to create an actual name of a file from provisional name thereof.

The method of the calculation for creating the actual name of 14 characters in length from the provisional name is now described with reference to FIG. 10. The first four bytes of the actual name form a fixed field which indicates that the file with the actual name is a file having a header. Characters usually not used in the computer system 23 are used for the fixed field. The next eight bytes of the actual name are determined by the length of the provisional name and by exclusive ORing every five bytes of the provisional name. The six resulting bits determine a hash value, every six bits of which is converted into a character. Thus, six eight-bit characters are converted to eight six-bit characters. The last two bytes of the actual name may optionally contain characters for preventing an actual name from overlapping with another actual name when the above-mentioned eight bytes overlap with the hash value of another provisional name.

Figure 11:
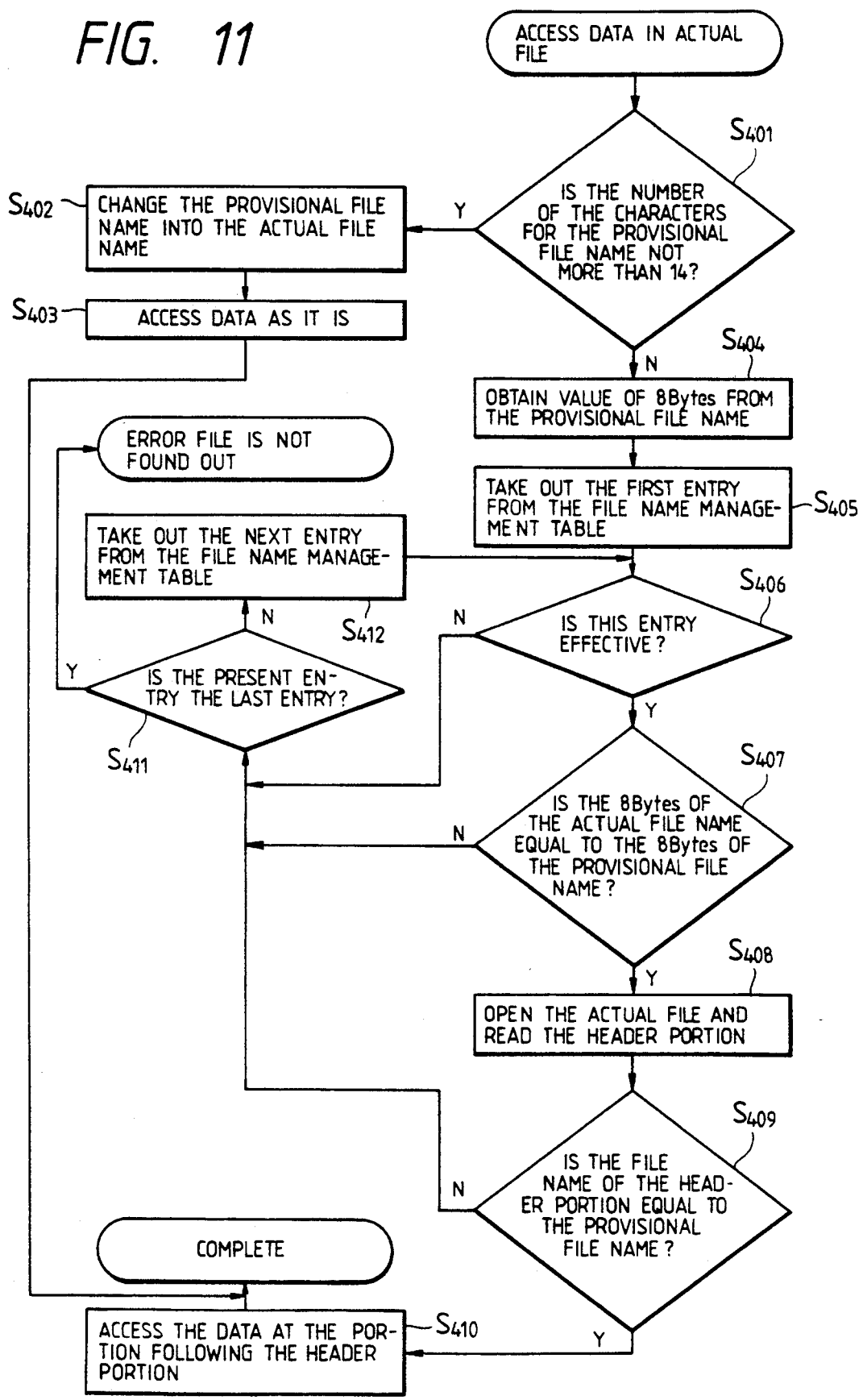
FIG. 11 shows a flow of processing to access the data of an actual file name.

FIG. 11 shows the flow of processing in which the file name extension system 22 accesses the data of the actual file. In a step $S_{401}$ shown in FIG. 11, the length of the provisional name is checked. If the length of the provisional name is 14 characters or less, the provisional name is handled as the actual name in a step $S_{402}$ so that the data of the actual name are accessed directly in a step $S_{403}$. If the length of the provisional name is more than 14 characters, the values of the above-mentioned eight bytes of the actual name are determined from the provisional name in a step $S_{404}$ and the first entry is selected from the file name management table 24 in a step $S_{405}$. This first entry is checked in a step $S_{406}$ to determine whether or not the selected entry is an effective one. An entry is effective if it contains valid information according to the flag field.

If it is judged in the step $S_{406}$ that the selected entry is not an effective one, the next entry is checked. If it is judged that the selected entry is an effective one, the value of the above-mentioned eight bytes of the actual name in the entry and that of the eight bytes, which is determined from the provisional name, are compared with each other in a step $S_{407}$. If the compared values are not equal to each other, the next entry is checked. If the compared values are equal to each other, the header of the file with the actual name is read in a step $S_{408}$. The file name stored in the header is compared with the provisional name in a step $S_{409}$. If the compared names do not coincide with each other, the next entry is checked. If the compared names coincide with each other, the non-header data section of the actual file is accessed in a step $S_{410}$. If the actual file is not found after checking all the entries in the file management table 24, the access is an error. According to the calculation method shown in FIG. 10, it is unlikely that the above-mentioned compared values are equal to each other. For this reason, the method of this embodiment does not access a file header unless the eight bytes of the actual and provisional file names match. Therefore, the efficiency of the processing is improved.

The file name extension system 22, which is of high reliability, makes it possible to input a file by using a relatively long name instead of a relatively short limited name without altering the file management method of the computer system 23, is thus realized at a low cost.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A file name length augmentation and file accessing computer system having a basic system and file name augmentation means, wherein said basic system includes processing means for performing processes which include processes of both creating and accessing a file with respect to a file name in accordance with a plurality of instructions that contain the file name, and a management means for managing the created file through use of a file name management table containing the file name, said file name augmentation means comprising:

converting means for converting a provisional file name having a number of characters exceeding a limit value into an actual file name having a number of characters less than or equal to the limit value by calculating a hash value and using the hash value as part of the actual file name;

first requirement means for supplying to said processing means instructions to create a new file having the actual file name converted by said converting means and instructions to write the provisional file name as initial data in the new file when the new file is created;

second requirement means for supplying access instructions including the actual file name converted by said converting means to said processing means when the new file is to be accessed; and determination means for determining a desired actual file name to be accessed by comparing a requested provisional file name with a provisional file name in a file having a particular actual file name, said particular actual file name having been obtained by supplying to said processing means the access instructions from the second requirement means including the particular actual file name converted from the requested provisional file name by said converting means, in accordance with the file name management table associated with said management means, and supplying the desired actual name to be accessed to the process means when the new file is to be accessed.

2. The file name length augmentation computer system according to claim 1, wherein said converting means calculates the hash value on the basis of a length of the provisional file name and a result of an EXCLUSIVE OR operation of the provisional file name, and wherein the actual file name includes not only a field of the calculated hash value but also an additional field for adding a variable to prevent the calculated hash value from overlapping with another hash value.

* * * * *